Patented Oct. 3, 1939

2,174,517

UNITED STATES PATENT OFFICE 2,174,517

MANUFACTURE OF GLASS

Frederick L. Koethen, Niagara Falls, N. Y., and Ignatius J. Wernert, Akron, Ohio, assignors to E. I. du Pont de Nemours & Company, Wilmington, Del., a corporation of Delaware No Drawing. Application July 21, 1938,
Serial No. 220,558

7 Claims. (Cl. 106—36.1)

This invention relates to the manufacture of glass and more particularly to the use of cyanides as ingredients for glass manufacture, to produce amber glass and for other useful purposes.

In glass manufacture, it is common practice to add carbon to the glass melt. Thus, common amber glass is made by dispersing carbon in the molten glass. Also carbon may be added to the glass melt as a reducing agent, for example to reduce salt cake (sodium sulfate) to the sulfite. One method of adding carbon to the glass consists in adding an organic carbon compound, usually carbohydrate such as starch or sugar, for example by mixing the organic material with the silica, soda ash and other materials to be melted together. The heat of melting carbonizes the organic material, thus forming carbon in the glass.

An object of the present invention is to provide an improved method for incorporating carbonaceous material in glass. A further object is an improved method for making a carbon amber glass. Other objects will be apparent from the following description.

These objects may be attained in accordance with the present invention by heating certain fusible inorganic cyanogen compounds in molten glass. The cyanogen compounds suitable for this purpose are the metal cyanides, cyanates and cyanamides, for example alkali metal cyanides such as sodium cyanide. Preferably, the inorganic cyanogen compound form is mixed with the glass making ingredients, e. g., soda ash, silica, lime and the like, and the mix then fused in the glass furnace or pot in the usual manner.

The amount of cyanogen compound to be used depends upon the reducing action or the extent of coloration desired and the nature of the glass composition. For example, in making an amber glass of an ordinary soda-lime glass composition, we may add to the glass batch 1 to 5% by weight of sodium cyanide. For deeper colors, approaching black, correspondingly larger amounts may be added.

The various alkali metal and alkaline earth metal cyanides, cyanamides and cyanates of the alkali and alkaline earth metals generally are preferred in practicing our invention; for example, cyanides, cyanates and cyanamides of sodium, potassium, lithium, calcium, barium and strontium. We prefer to use sodium cyanide, since this is readily available in a pure form, is relatively inexpensive and gives excellent results.

An advantage of the present invention is that the cyanogen compounds utilized dissolve in the glass melt before decomposing to release elementary carbon. The result is that the carbon particles are formed within the glass melt in suspension and in an extremely fine state of subdivision. This results in improved results, e. g., a glass of improved amber color and high degree of transparency and also, to a marked degree protects the carbon from oxidation by the furnace gases. For these reasons, in practicing our invention a smaller amount of the carbon compound need be used, as compared with the prior methods utilizing organic materials such as sugar and the furnace gas control is simplified. Further, a smaller amount of the inorganic cyanogen compound, e. g., sodium cyanide, generally is required than of an organic carbon compound or of free carbon, to produce the same result.

We claim:

1. In a glass making process, the step comprising introducing into the glass melt an inorganic cyanogen compound selected from the group consisting of the metal cyanides, cyanates and cyanamides.

2. In a glass making process, the step comprising introducing into the glass melt an inorganic cyanogen compound selected from the group consisting of the metal cyanides, cyanates and cyanamides, in an amount sufficient to impart an amber color to the resulting glass.

3. In a glass making process, the step comprising introducing sodium cyanide into the glass melt.

4. In a glass making process, the step comprising introducing sodium cyanide into the glass melt in an amount sufficient to impart an amber color to the resulting glass.

5. In a glass making process, the step comprising introducing about 1 to 5% by weight of sodium cyanide into the glass melt.

6. A process comprising adding to glass making ingredients an inorganic cyanogen compound selected from the group consisting of the metal cyanides, cyanates and cyanamides and fusing the resulting mixture.

7. A process comprising adding sodium cyanide to glass making ingredients and fusing the resulting mixture.

FREDERICK L. KOETHEN.
IGNATIUS J. WERNERT.